United States Patent
Kitagawa

[19]

[11] Patent Number: 6,091,234
[45] Date of Patent: *Jul. 18, 2000

[54] CONTROL CIRCUIT OF A SYNCHRONOUS RECTIFICATION TYPE DC-DC CONVERTER

[75] Inventor: Seiya Kitagawa, Kanagawa, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/124,846

[22] Filed: Jul. 30, 1998

[30] Foreign Application Priority Data

Jan. 30, 1998 [JP] Japan .................................. 10-019171

[51] Int. Cl.[7] ............................................. G05F 1/613
[52] U.S. Cl. ............................................. 323/244; 323/901
[58] Field of Search ............................. 323/224, 901, 323/282, 283, 285

[56] References Cited

U.S. PATENT DOCUMENTS 5,602,464  2/1997  Linkowsky et al. .................... 323/272
5,781,000  7/1998  Saeki et al. ........................... 323/234

FOREIGN PATENT DOCUMENTS 9-154275  6/1997  Japan .

Primary Examiner—Shawn Riley
Attorney, Agent, or Firm—Armstrong, Westerman, Hattori, McLeland & Naughton

[57] ABSTRACT

A DC-DC convertor is used as a power source for an electronic apparatus. In this converter, a synchronous rectification transistor is provided in parallel with a flywheel diode. A control circuit of the converter is configured in such a way that a synchronous rectification transistor isolating unit for compulsorily turning off the synchronous rectification transistor for a predetermined fixed period of time, at the activation time of the DC—DC convertor, is included.

9 Claims, 16 Drawing Sheets

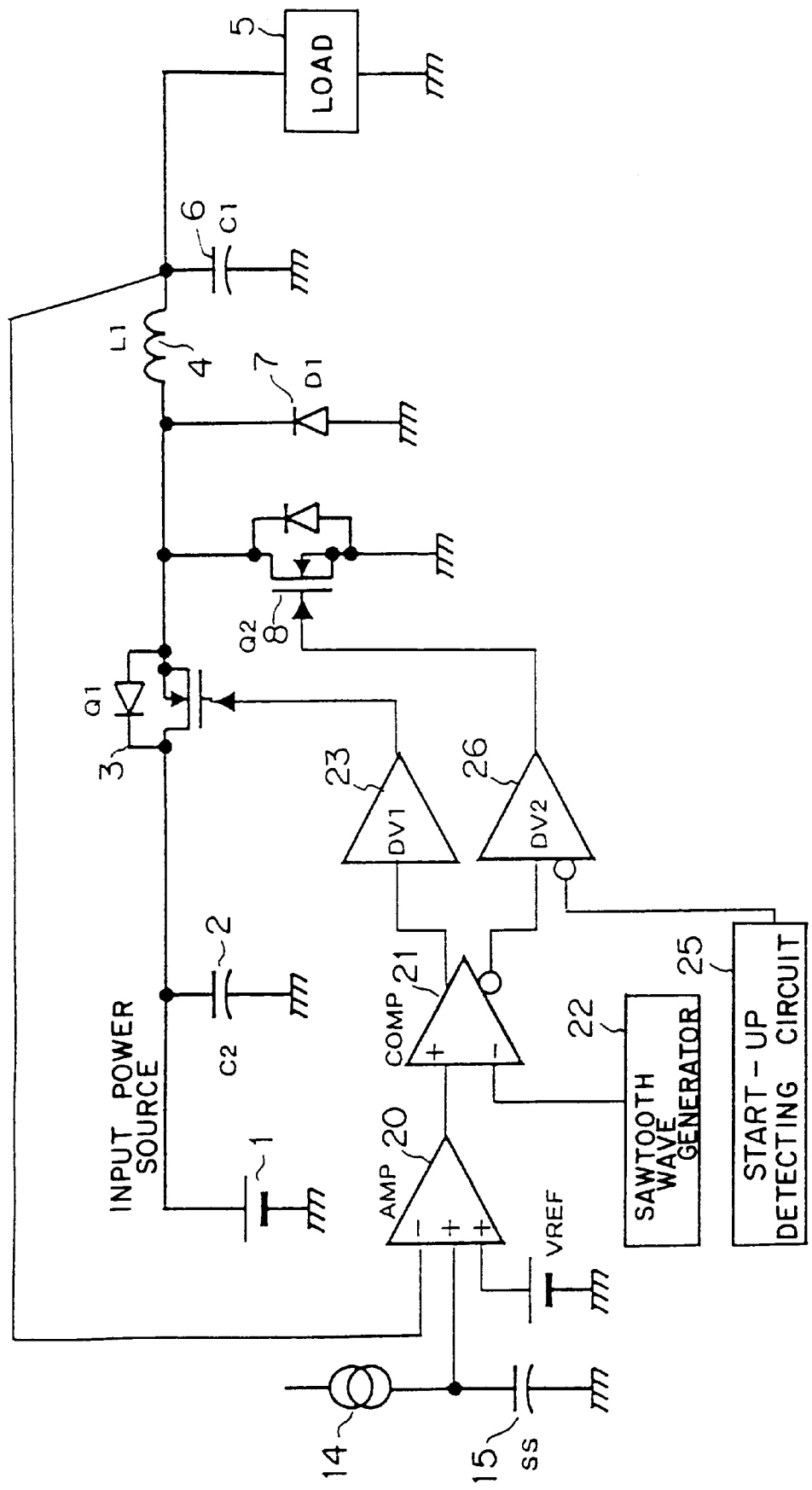
F I G. 6

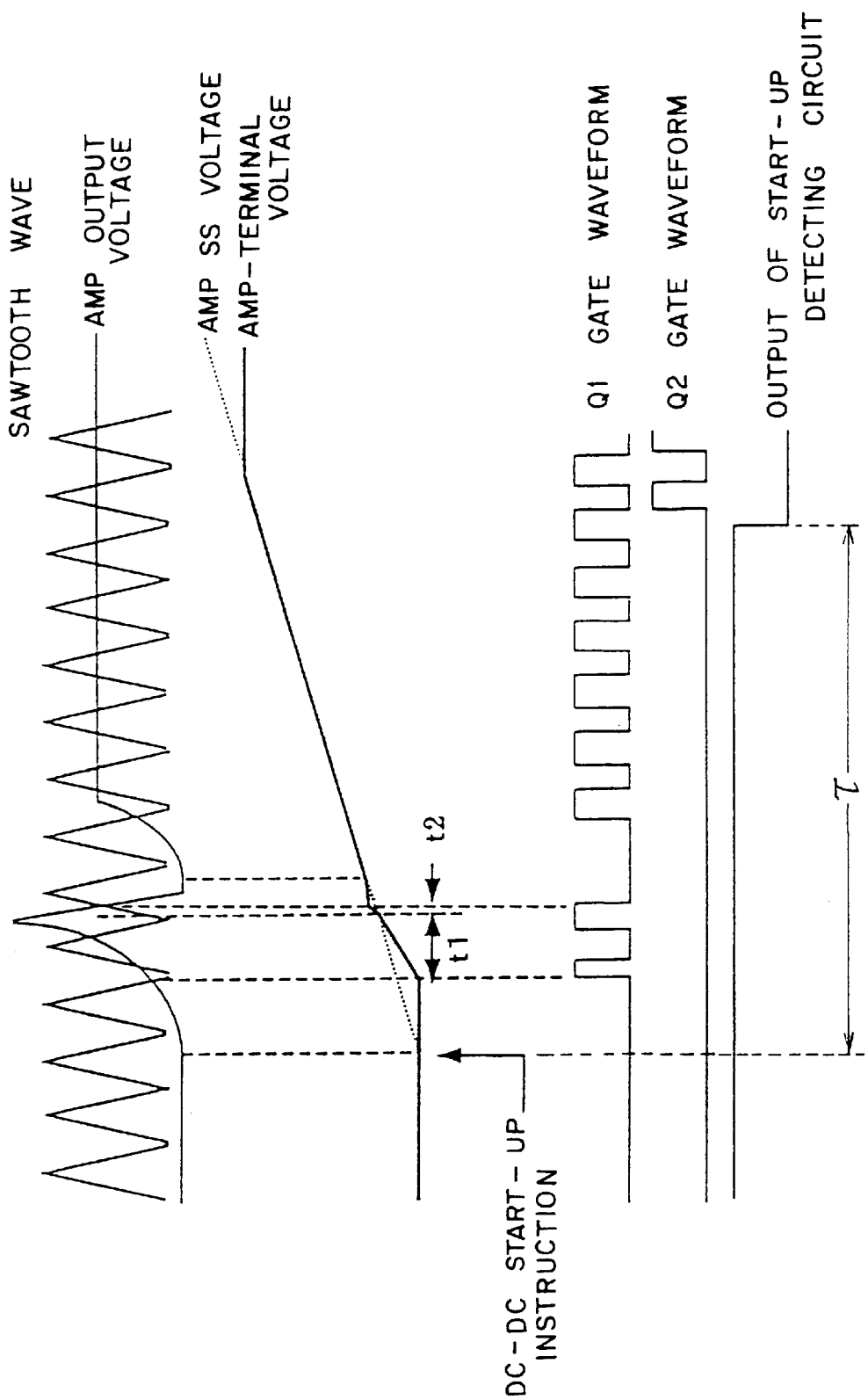
F I G. 7

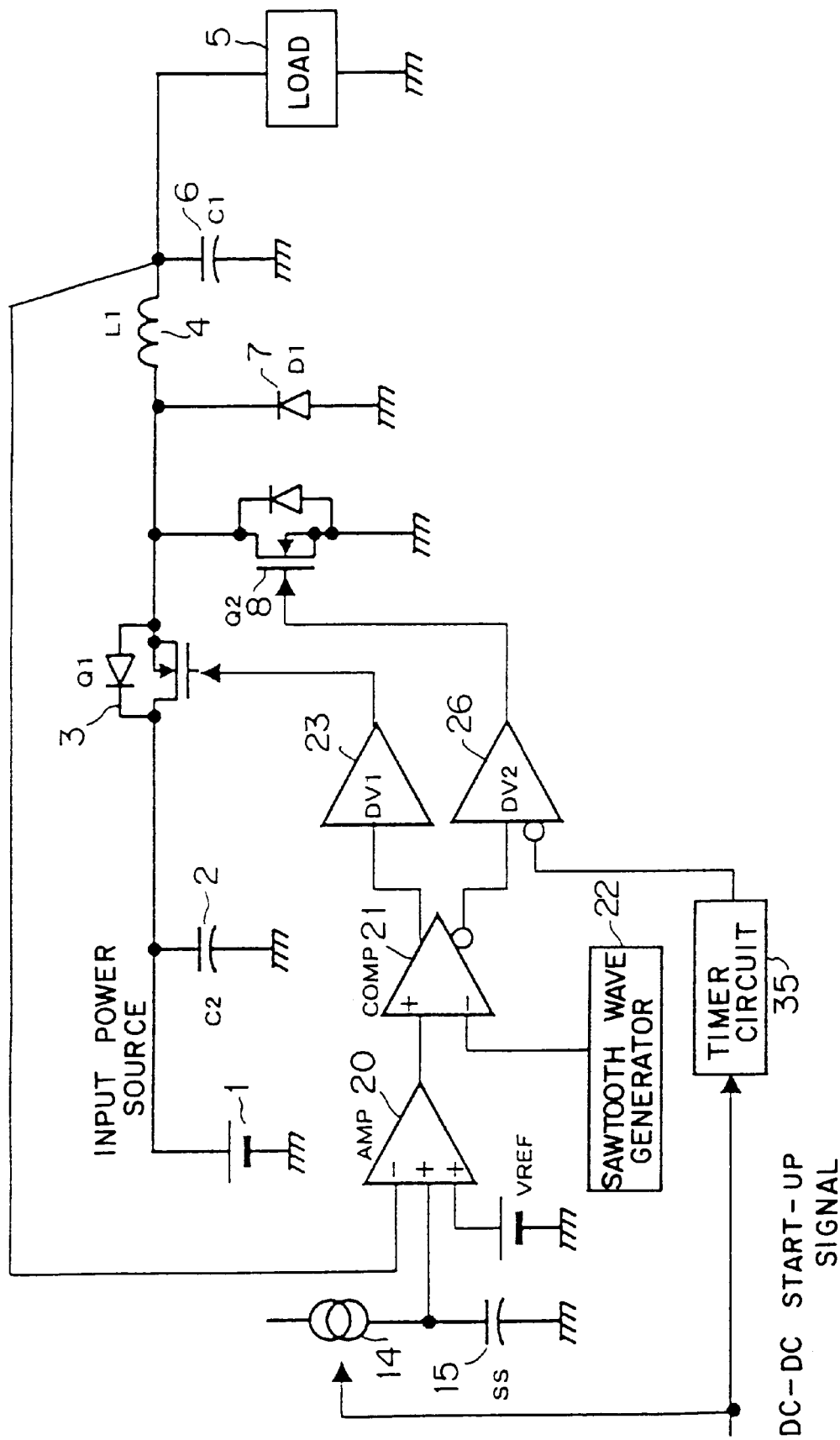
F I G. 10

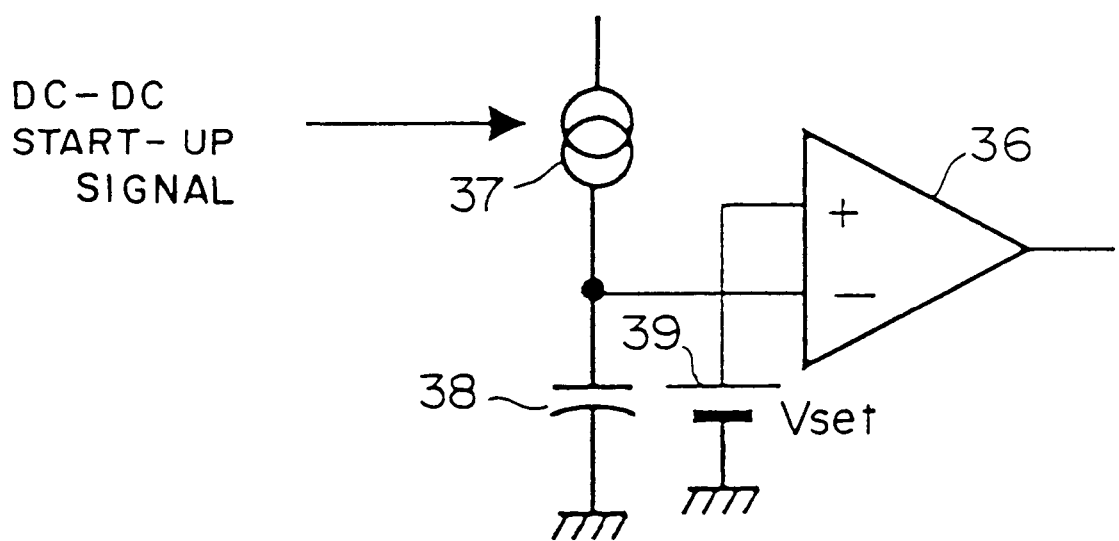
F I G. 11

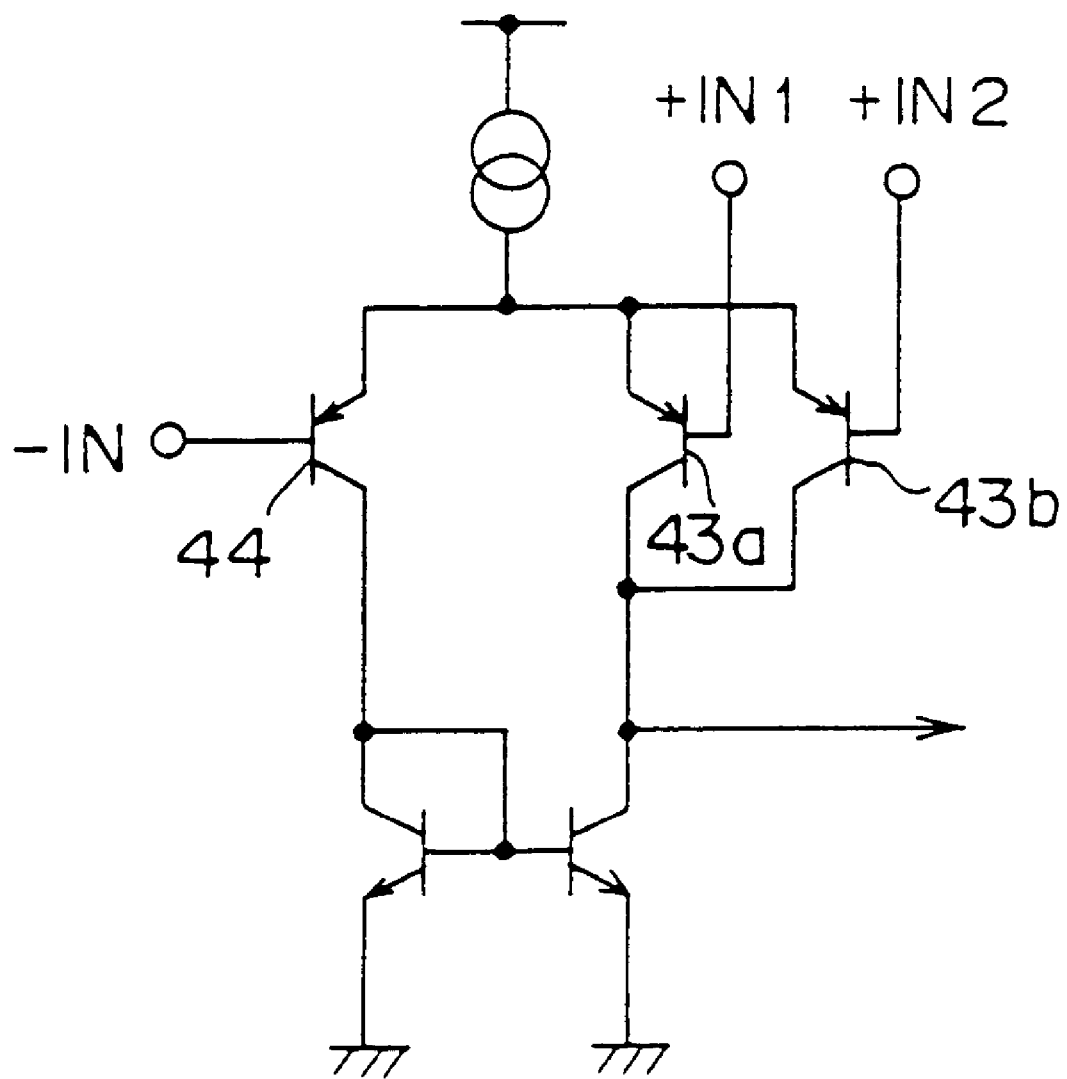
F I G. 14

CONTROL CIRCUIT OF A SYNCHRONOUS RECTIFICATION TYPE DC-DC CONVERTER

BACKGROUND OF THE INVENTION

1. Field of the Invention

The present invention relates to a control circuit of a direct current-direct current (DC—DC) convertor to be used as a power source for various electronic apparatuses. More particularly, it is related to a control circuit of a DC—DC convertor to be used for keeping constant the value of a voltage which is supplied to a hand-held-type electronic apparatus such as a notebook-type personal computer or the like, even if the voltage of a battery installed in the power source of this apparatus varies.

2. Description of the Related Art

In a hand-held type electronic apparatus such as a notebook-type personal computer or the like, a stepdown-type DC—DC convertor is used for keeping the voltage to be supplied to this apparatus constant, even if the output voltage of the battery installed in this apparatus reduces as it progressively discharges.

FIG. 1 is a schematic diagram showing a step-down DC—DC convertor and its control circuit. In this figure, power supplied from an input power source 1 to a load 5 is controlled by the DC—DC convertor. A capacitor 2 (C2) smooths a rectangular waveform current which is generated by the ON/OFF operation of transistor Q1, but this capacitor is not required if the output impedance of the input power source 1 is sufficiently small. A transistor 3 (Q1) is a main transistor to be used as the switch in the DC—DC convertor. Power to be supplied to the load 5 is adjusted by controlling an ON time of the transistor 3 using, for example, a PWM (Pulse Width Modulation) control. An inductor 4 (L1) is a smoothing reactor, and a capacitor 6 (C1) is a smoothing capacitor. A diode 7 (D1) is a flywheel diode used for rectification.

During the ON time of the transistor 3, power outputted from the input power source 1 is supplied to the load 5 and the capacitor 6 through the smoothing reactor 4. During the OFF time of the transistor 3, power is not supplied from the input power source 1 to the load 5. Instead, power is supplied to the load 5 by supplying the energy stored in the smoothing reactor 4 by the capacitor 6 and the flywheel diode 7.

In FIG. 1, the control circuit of the DC—DC convertor is basically composed of an amplifier 10 for amplifying an error voltage, a comparator 11, a sawtooth wave generator 12, and a driver 13.

The amplifier 10 amplifies the difference between a predetermined reference voltage Vref and a feedback voltage from the output of the DC—DC convertor.

The comparator 11 has three inputs. The output from the amplifier 10 and a soft start (SS) voltage (the terminal voltage of a capacitor 15) are respectively inputted to two non-inverting inputs among the three inputs. The output of the sawtooth wave generator 12 is inputted to the inverting input. The comparator 11 compares the input having the lowest voltage value between the two non-inverting inputs with the inverting input. Then the comparator 11 outputs H when the value of the non-inverting input having the lowest voltage is larger than the value of the inverting input, and outputs L in the reverse case.

A terminal voltage of the capacitor 15 which is charged by a current outputted from a constant current source 14 is supplied as an SS voltage. When the DC—DC convertor is activated, both ends of the capacitor 15 are briefly connected by a switching circuit, not-shown in FIG. 1. Accordingly, the SS voltage increases from 0 with a constant gradient from when the convertor is activated.

The output of the comparator 11 is supplied to a gate terminal of the main transistor 3 of the DC—DC convertor through the driver 13. Since the transistor 3 is an n-channel-type FET, it becomes ON while the output of the driver 13 is H, that is, the comparator 11 is outputting H. During this period, current is supplied from the input power source 1 to a load 5 side.

FIG. 2 is a time-chart explaining the operations of the DC—DC convertor control circuit shown in FIG. 1. In this figure, operations of the control circuit at the activation time of the DC—DC convertor are explained. In FIG. 1, an SS voltage for a soft start is inputted to one of the two non-inverting inputs of the comparator 11. First, a case where an input terminal for the SS voltage is not provided is assumed. In FIG. 2, since the output of the DC—DC convertor, that is, the voltage to be supplied to the load 5 is 0 at the moment of the activation of the convertor when t=0, an input voltage to be inputted to the inverting input terminal of the amplifier (error amplifier) 10 for amplifying an error voltage is 0, and the output of the amplifier 10 becomes the maximum. As time elapses, the output voltage of the convertor rises, and accordingly, the output of the amplifier 10 gradually lowers. When the input terminal for the SS voltage is not provided, the comparator 11 compares the output of the amplifier 10 with that of the sawtooth wave generator 12. Then, the comparator 11 outputs H while the output of the amplifier 10 is greater than that of the sawtooth wave generator 12, and this output becomes the signal for turning on the transistor 3 through the driver 13. Therefore, when the input terminal for the SS voltage is not provided, the ON time of the transistor 3 becomes long immediately after the activation of the convertor, so the ON duty becomes 100%. As a result, a high input current flows into the transistor 3 and the smoothing reactor 4. In order to prevent this flow of high input current, the SS voltage is inputted to the comparator 11.

The comparator 11 compares the value of the signal having the lowest voltage between the signals inputted to the two non-inverting input terminals, with the value of the sawtooth wave signal supplied to the inverting input terminal. Then, the comparator 11 outputs H only while the non-inverting input signal having the lowest voltage value is greater than the sawtooth wave signal. The SS voltage, that is, the terminal voltage of the capacitor 15, gradually rises with time as shown in FIG. 2, and the output of the comparator 11, that is, the gate control signal of the transistor 3, becomes H only while this terminal voltage is higher than the sawtooth wave voltage. At time tc, the output voltage of the amplifier 10 is equivalent to the terminal voltage of the capacitor 15. At or after this time, the output of the comparator 11 becomes H while the output of the amplifier 10 is higher than the sawtooth wave voltage. Thus, at the activation time of the convertor, a soft start operation in which the output of the comparator 11 becomes H, that is, the ON time of the transistor 3 gradually becomes longer, is realized.

In the circuit shown in FIG. 1, as explained in detail by the inventor in a prior filed application, the point where the output of an amplifier for amplifying a voltage error and the rising terminal voltage of the soft start capacitor cross, that is, the time tc shown in FIG. 2, depends on the amount of the load on the DC—DC convertor. Further, as the load becomes smaller, the time tc becomes shorter, and as the load becomes bigger, the time tc becomes longer. Therefore, the rising output characteristic of the DC—DC convertor could not be controlled by the capacitance of the soft start capacitor 15.

Prior filed application: Tokkaihei No. 9-154275 (Tokuganhei No. 7-308856) "Direct current-direct current conversion control circuit and direct current-direct current conversion apparatus"

FIG. 3 is a circuit diagram of the second conventional example of a DC—DC convertor and its control circuit. Since the operations of this circuit were explained in the above prior filed application, only an outline of this application will be explained below.

When FIG. 3 is compared with FIG. 1, there are some basic differences. That is, while a voltage error amplifier 20 has three inputs, a comparator 21 has two inputs. Further, synchronous type of rectification is adopted. According to this type, a synchronous rectification transistor 8 (Q2, an n-channel-type FET) is connected in parallel with the flywheel diode 7 on a DC—DC convertor side, and a driver 24 for supplying an OFF/ON signal to the gate terminal of the transistor 8 is added.

In FIG. 3, two non-inverting inputs are provided to the voltage error amplifier 20. To one of the two inputs, the soft start voltage supplied to the comparator 11 as shown in FIG. 1 is inputted. By contrast, the comparator 21 compares the output of the amplifier 20 and that of the sawtooth wave generator 22, and supplies a non-inverting output to a driver 23 while the output of the amplifier 20 is greater than the sawtooth wave voltage outputted from the sawtooth wave generator 22. The output signal of the driver 23 is supplied to the gate terminal of the transistor 3. An inverting output of the comparator 21 is supplied to the gate terminal of the transistor 8 through the driver 24. When the output signal of the driver 24 is H, the transistor 8 turns on. The transistor 8 turns on while the transistor 3 turns off. At this time, since power is supplied to the load 5 by flowing the energy stored in the smoothing reactor 4 through the capacitor 6 and the transistor 8, the loss caused by the flywheel diode 7 can be reduced. Therefore, this transistor 8 is called a synchronous rectification transistor.

Thus, by inputting the soft start voltage to the voltage error amplifier 20 as shown in FIG. 3, not by inputting it to the comparator 11 as shown in FIG. 1, the dependence of the rising characteristic of an output voltage at the activation time of the DC—DC convertor on the load on the convertor is removed, so that this rising characteristic can be controlled only by changing the constant of the soft start capacitor 15. The detail of this process is omitted since it was fully explained in the above-mentioned prior filed application, and further it is not directly related to the contents of the present invention.

In FIG. 3, however, there arises a new problem that at the activation time of the convertor, an oscillating current (resonance current) flows into the smoothing reactor 4, the smoothing capacitor 6, and the synchronous rectification transistor 8, so that the output voltage of the convertor instantaneously becomes excessive, and the load may be destroyed in such a case.

FIG. 4 is a timechart explaining this problem. In this chart, after a start-up instruction for the DC—DC convertor is supplied, the capacitor 15 for a soft start begins to be charged from the constant current source 14, and the terminal voltage (SS voltage) of the capacitor 15 linearly rises. At this time, an input voltage to the inverting input terminal of the voltage error amplifier 20, that is, the output voltage of the DC—DC convertor, rises corresponding to the gain Rc/Rin of the amplifier. When the output voltage rises up to the point to cross the sawtooth wave generated by the sawtooth wave generator 22, the output of the comparator 21 becomes H, and an ON signal is supplied to the main transistor 3 through the driver 23.

In respect of the pulse widths causing the main transistor (Q1) 3 to turn on, the second pulse has a wider width than that of the first pulse, as shown in FIG. 4. In FIG. 4, however, only two pulses generated immediately after the activation are shown. Generally, however, a plurality of pulses are generated immediately after the activation, and the pulse width is gradually wider with time. As a result, the output voltage of the DC—DC convertor gradually rises. At the point where this output voltage becomes equivalent to the terminal voltage (SS voltage) of the soft start capacitor, the amplifier 20 intends to immediately reduce its own voltage output. However, in the case where the gain of the amplifier 20 is high, it is necessary to insert a capacitor Cc in series with resistor Rc to delay the phase of the amplifier 20, thereby preventing the oscillation of the amplifier 20. By doing so, the output voltage of the amplifier 20 overshoots, and the amplifier 20 continues to be ON excessively for the period of time t2 as shown in FIG. 4.

As a result, the output voltage of the DC—DC convertor further rises, and becomes greater than the terminal voltage of the soft start capacitor 15. Then, the output voltage of the amplifier 20 reduces, and becomes smaller than the sawtooth wave outputted from the sawtooth wave generator 22. Accordingly, the non-inverting output of the comparator 21 becomes L, and the inverting output thereof becomes H, thereby turning off the main transistor 3, and turning on the synchronous rectification transistor 8 through the drivers 23 and 24, respectively.

Here, when the synchronous rectification transistor 8 turns on, the energy stored in the smoothing reactor 4 flows along a route which passes through the smoothing capacitor 6 and the synchronous rectification transistor 8 during the excessive ON time of the main transistor 3, that is, time t2. At this time, a current oscillation (resonance) caused by a smoothing reactor L and a smoothing capacitor C is generated, and during an OFF time of the main transistor 3, the output voltage of the convertor immediately rises shown as an inverting input terminal voltage of the amplifier 20 in FIG. 4. Therefore, in a worst case, there might arise the problem that the output voltage of the convertor exceeds the maximum rating of the load, thereby destroying the load.

In order to remove such a phenomenon, the gain of the amplifier 20 is reduced, and the overshooting as shown in FIG. 4 is not generated in the output voltage of the amplifier, so that the oscillation of the output voltage of the DC—DC convertor can be prevented. In this case, however, there is a problem that since the response characteristic of the amplifier deteriorates, the response characteristic of the convertor also deteriorates when the load changes rapidly.

SUMMARY OF THE INVENTION

The object of the present invention is to provide a control circuit of a DC—DC convertor for safely starting the DC—DC convertor without generating a big oscillation in the output voltage at the activation time of the convertor.

The control circuit of a DC—DC convertor which is one embodiment of the present invention is one for controlling a DC—DC convertor provided with a synchronous rectification transistor connected in parallel with a flywheel diode. This control circuit comprises an output voltage control unit for controlling the DC—DC convertor in order to keep the output voltage of the DC—DC convertor constant, and a synchronous rectification transistor isolating unit for compulsorily turning off this transistor for a predetermined period of time.

The control circuit of a DC—DC convertor which is another embodiment of the present invention is one for controlling the DC—DC convertor of a synchronous rectification type provided with a synchronous rectification transistor. This control circuit comprises an output voltage control unit for controlling the DC—DC convertor to keep the output voltage of the DC—DC convertor constant, and a synchronous rectification transistor isolating unit for compulsorily turning off the synchronous rectification transistor for a predetermined period of time at the activation of the DC—DC convertor.

The oscillation of the output voltage of a conventional DC—DC convertor generated at the time of activation is caused by the resonance generated by a smoothing reactor and a smoothing capacitor which are provided in the DC—DC convertor. In both the above-mentioned embodiments according to the present invention, the synchronous rectification transistor isolates the resonance route through the control of the synchronous rectification transistor isolating unit. As a result, the oscillation of the output voltage of the DC—DC convertor at the time of activation can be prevented.

BRIEF DESCRIPTION OF THE DRAWINGS

The present invention will be more apparent from the following detailed description, when taken in conjunction with the accompanying drawings, in which

FIG. 6 is a circuit diagram showing a basic configuration of the control circuit of a DC—DC convertor according to the present invention;

FIG. 7 is a timechart showing the operations in the basic configuration shown in FIG. 6;

FIG. 10 is a circuit diagram showing the configuration of a third embodiment of the DC—DC convertor and its control circuit;

FIG. 11 is a diagram showing a configuration example of a timer circuit according to the third embodiment shown in FIG. 10;

FIG. 14 is a circuit diagram showing an error amplifier with three inputs;

DESCRIPTION OF THE PREFERRED EMBODIMENTS

Figure 5:
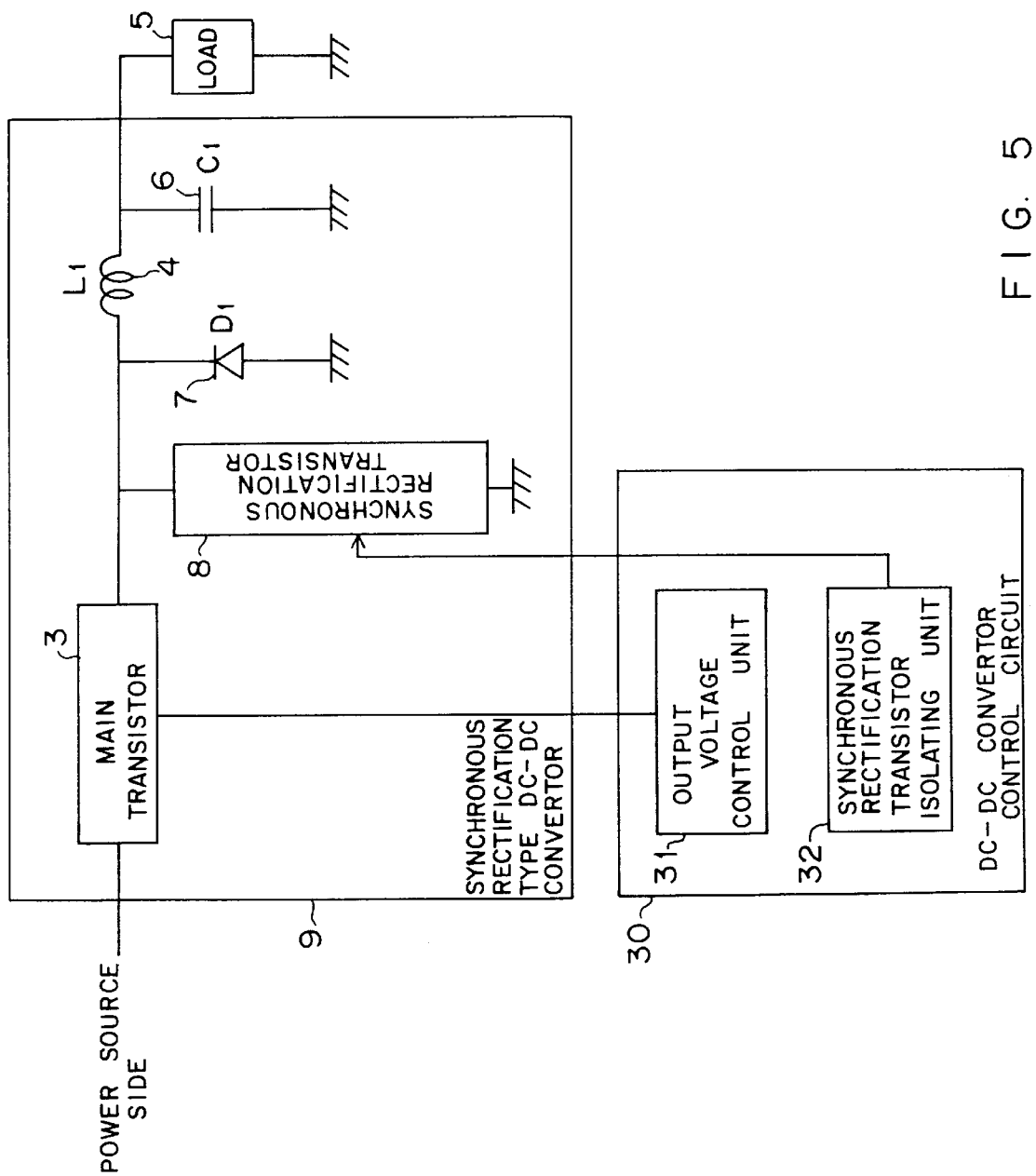
FIG. 5 is a block diagram showing a principle configuration of the present invention.

FIG. 5 is a block diagram showing the principle configuration of the present invention. This figure is a block diagram showing the principle configuration of a control circuit 30 of a synchronous rectification type of DC—DC convertor 9 provided with a synchronous rectification transistor 8.

In FIG. 5, the synchronous rectification type of DC—DC convertor 9 comprises a main transistor 3, a smoothing reactor 4, a capacitor 6, and a flywheel diode 7 in addition to a synchronous rectification transistor 8. This convertor 9 can keep the output voltage to be supplied to a load 5 constant by turning on/off the main transistor 3 using, for example, a PWM control.

The synchronous rectification transistor 8 turns on when the main transistor 3 turns off, that is, while power is not directly supplied to the load 5 from a power source. Instead of the power supplied from the power source, this transistor 8 supplies the energy stored in the smoothing reactor 4 to the load 5. In this figure, the synchronous rectification transistor 8 is connected in parallel with the flywheel diode 7 so that a loss generated by the flywheel diode 7 is reduced.

An output voltage control unit 31 provided in the DC—DC convertor control circuit 30 controls the main transistor 3 so that the output voltage to be supplied to the load 5 from the synchronously rectifying type DC—DC convertor 9 can be kept constant.

A synchronous rectification transistor isolating unit 32 provided in the DC—DC convertor control circuit 30 compulsorily turns off the synchronous rectification transistor 8 only during a predetermined period of time at the activation of the synchronous rectification type DC—DC convertor, without regard to an ON/OFF condition of the main transistor 3. The DC—DC convertor control circuit of an embodiment according to the present invention is provided with an error amplifier. To this error amplifier, a first input voltage obtained from the output voltage after a DC—DC conversion, a second input voltage which is a predetermined reference voltage, and a third input voltage to be used as a soft start signal whose value rises at and after the activation of the DC—DC convertor, are inputted. Then, the difference between the input voltage having the lowest potential between the second and third input voltages, and the first input voltage is amplified, thereby to be outputted for the PWM control.

The synchronous rectification transistor isolating unit 32 of the present invention comprises a voltage comparator for comparing, for example, the second and third input voltages to be inputted to the above-mentioned error amplifier, and a driver for turning off the synchronous rectification transistor when the third input voltage is smaller than the second input voltage.

The DC—DC convertor control circuit of the present invention can be provided with an error amplifier with two inputs in place of the above-mentioned error amplifier with three inputs. To this error amplifier, a first input voltage obtained from the output voltage after a DC—DC conversion, and a second input voltage whose maximum value is the value of the predetermined reference voltage and which is used-as a soft start signal whose value rises at and after the activation of the DC—DC convertor, are inputted. Then, the difference between the first input voltage and the second input voltage is amplified, thereby to be outputted as a signal for the PWM control.

Figure 1:
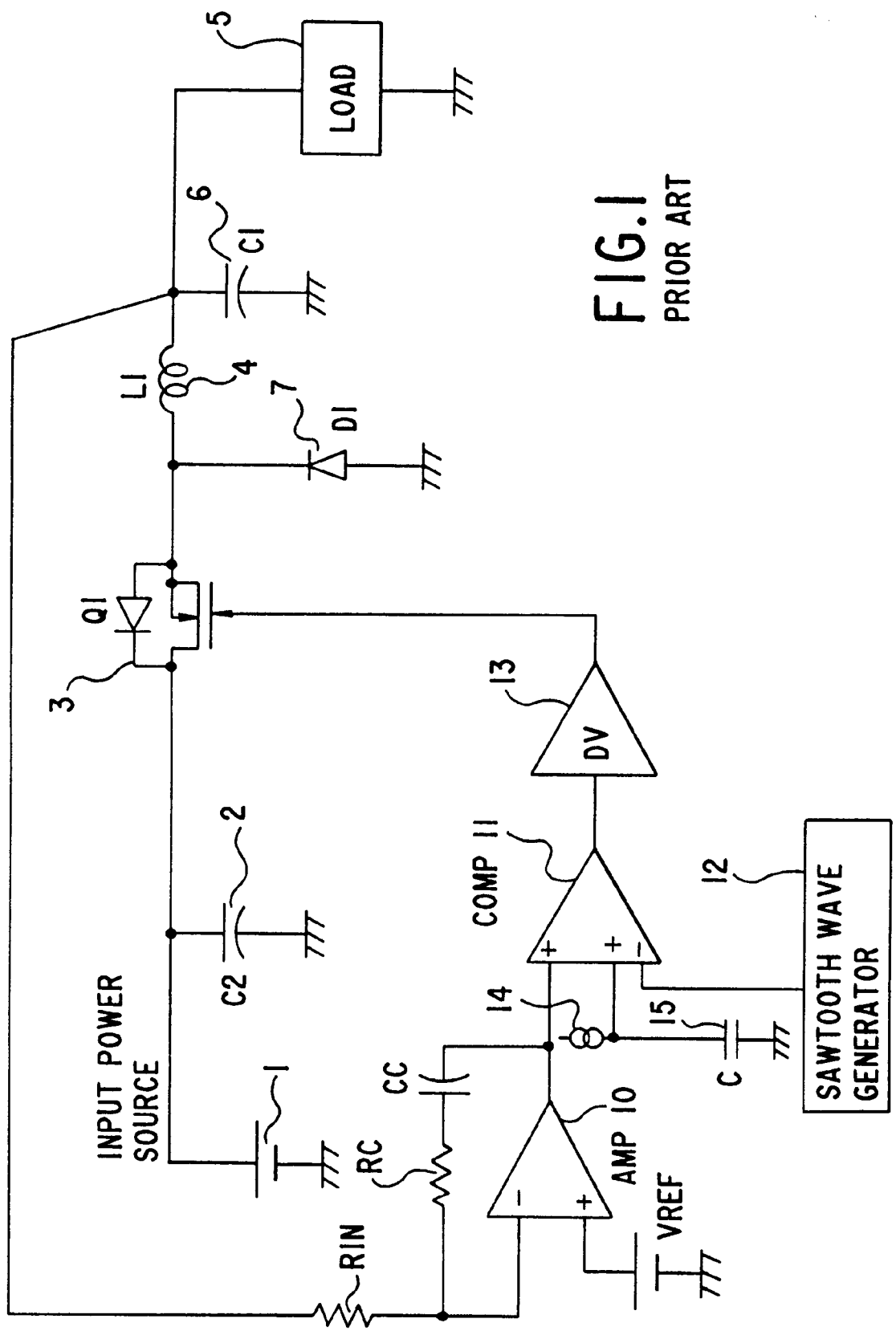
FIG. 1 is a circuit diagram showing a first conventional example of the control circuit of a DC—DC convertor.
Figure 2:
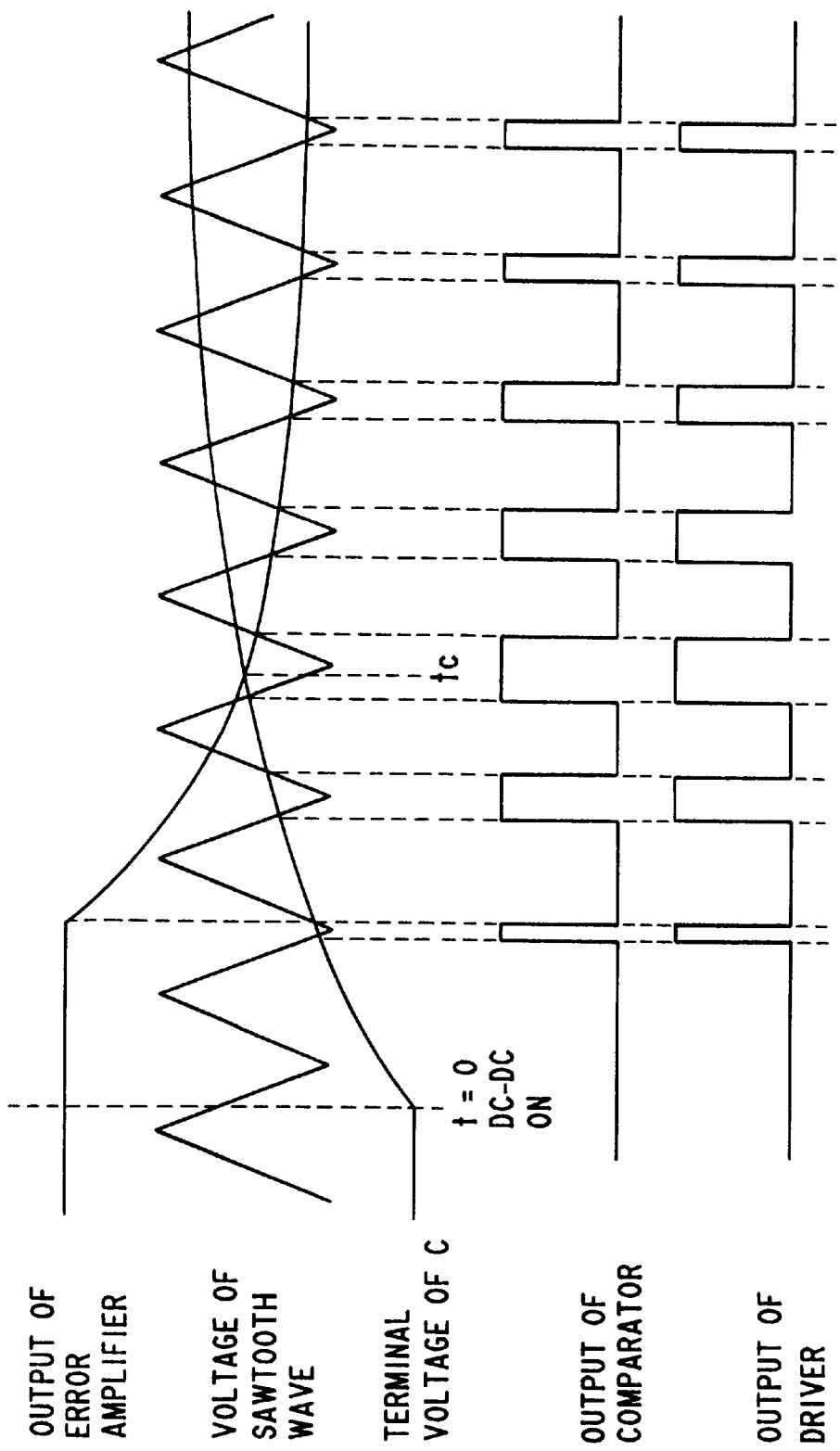
FIG. 2 is a timechart showing the operations of the control circuit shown in FIG. 1.
Figure 3:
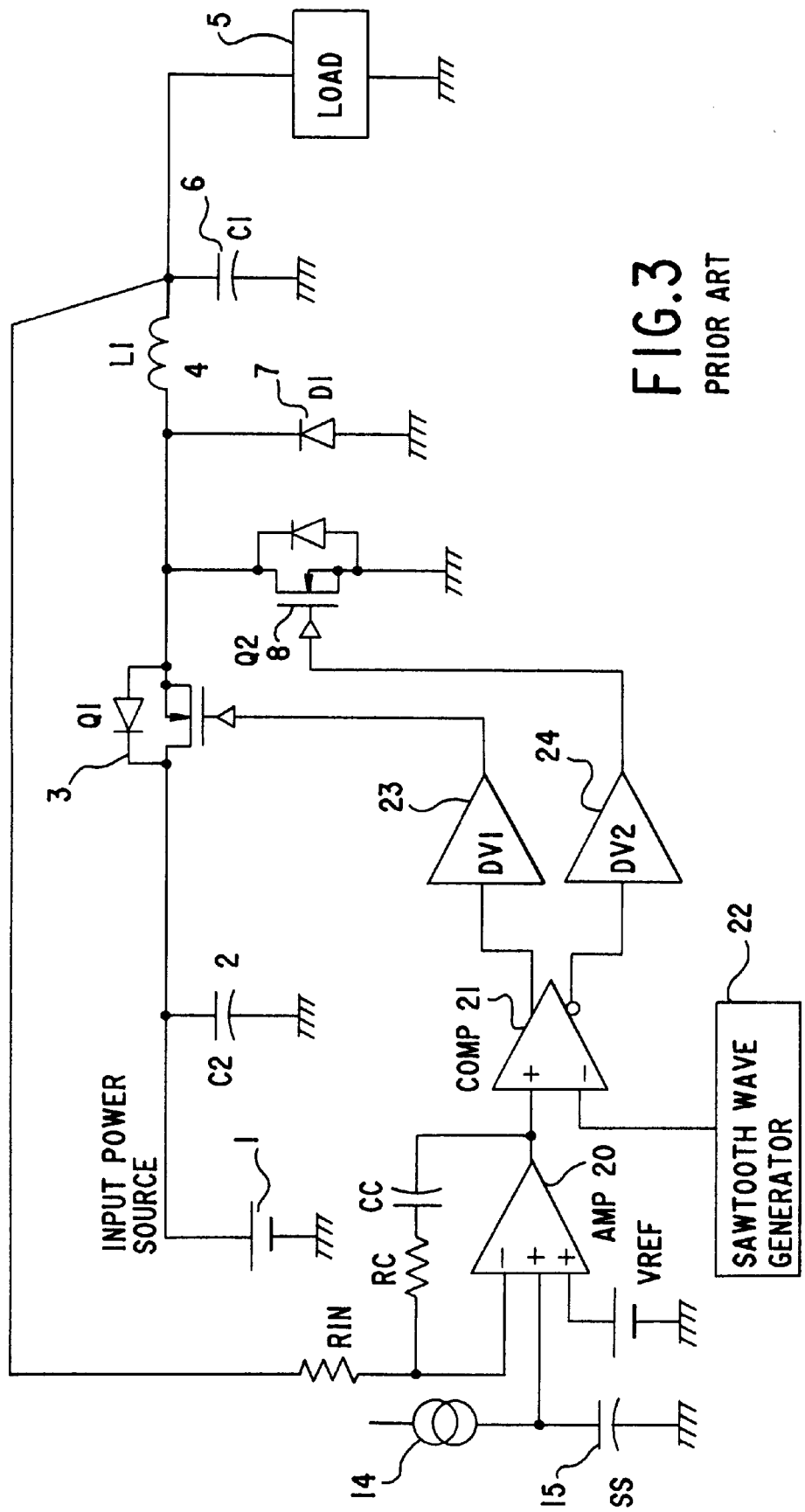
FIG. 3 is a circuit diagram showing a second conventional example of the control circuit of a DC—DC convertor.

FIG. 6 is a circuit diagram showing a principle configuration of a DC—DC convertor and its control circuit according to the present invention. In this figure, the same numerals as those shown in FIG. 3 indicate the same items. There are two different items from those shown in FIG. 3. One is a start-up detecting circuit 25. The other is an inverting input terminal provided on a driver 26 for outputting a gate control signal to the synchronous rectification transistor 8, in addition to a non-inverting input terminal to which the inverted output of the comparator 21 is inputted. In FIG. 6, Rin, Rc, and Cc (shown in FIG. 3) connected to the amplifier 20 are omitted. These are also omitted in the circuit diagrams of embodiments shown in FIG. 8 and the following figures, to be described later.

Figure 4:
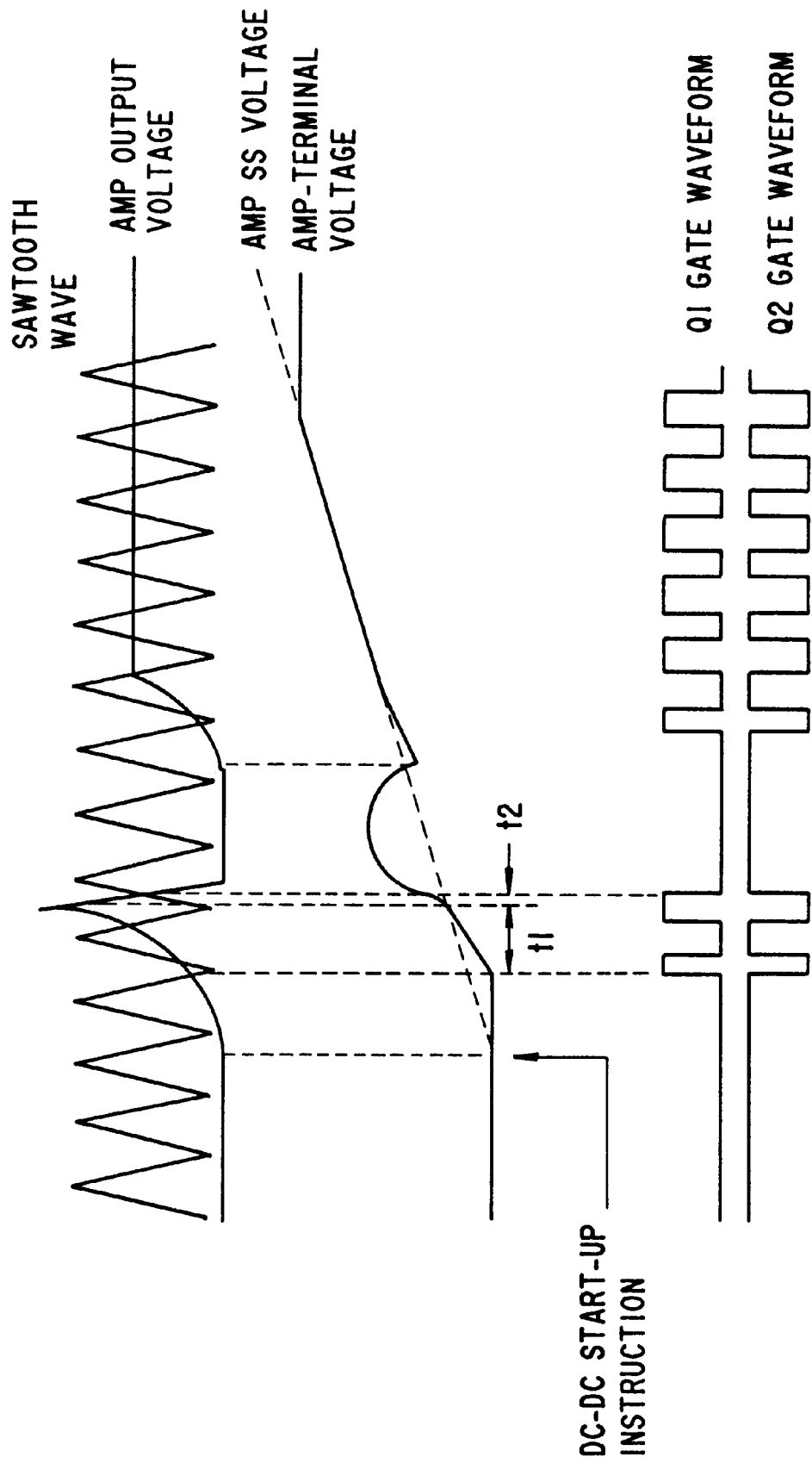
FIG. 4 is a timechart showing a problem of the conventional example shown in FIG. 3.

FIG. 7 is a timechart showing the operations of the control circuit shown in FIG. 6. In FIG. 7, the output of the start-up detecting circuit 25 shown in FIG. 6 is set to H, for example, before the start-up instruction is supplied to the DC—DC convertor, and stays at H for a time τ after the start-up instruction is supplied. That is, since a signal to cancel the inverting output H of the comparator 21 is supplied to the inverting input of the driver 26 from the start-up detecting circuit 25 during the period of time τ after the start-up instruction is supplied to the convertor, the output of the driver 26 remains L, even if the overshooting problem which was explained using FIG. 4 is generated in the output voltage of the amplifier 20. Accordingly, the synchronous rectification transistor 8 does not turn on during this period of time. Therefore, the loop of a resonant current passing through the smoothing reactor 4, the smoothing capacitor 6 and the synchronous rectification transistor 8, is disconnected so that the voltage level of the output of the DC—DC convertor does not change as shown in FIG. 4.

Figure 8:
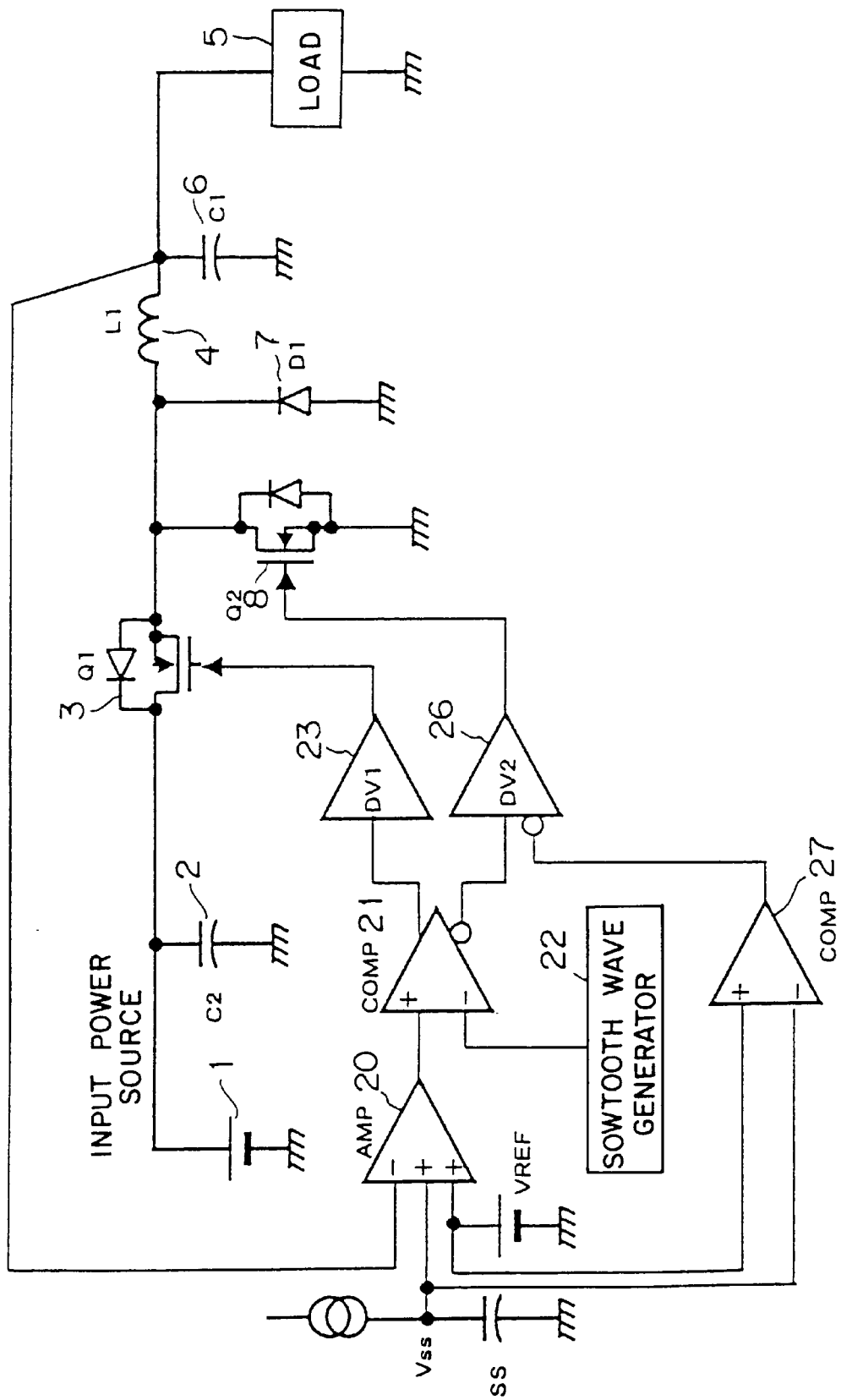
FIG. 8 is a circuit diagram showing the configuration of a first embodiment of the DC—DC convertor and its control circuit.

FIG. 8 is a diagram circuit of a first embodiment of the DC—DC convertor control circuit according to the present invention. In this figure, the start-up detecting circuit 25 shown in FIG. 6 is configured by a comparator 27. To this comparator 27, the reference voltage Vref also connected with one non-inverting input of the amplifier 20, and a soft start voltage Vss also connected with the other non-inverting input of the amplifier 20 are inputted. The comparator 27 outputs H at the time of activation of the DC—DC convertor, that is, while the soft start voltage is smaller than the reference voltage Vref, and causes the output of the driver 26 to be L, thereby turning off the synchronous rectification transistor 8.

Figure 9:
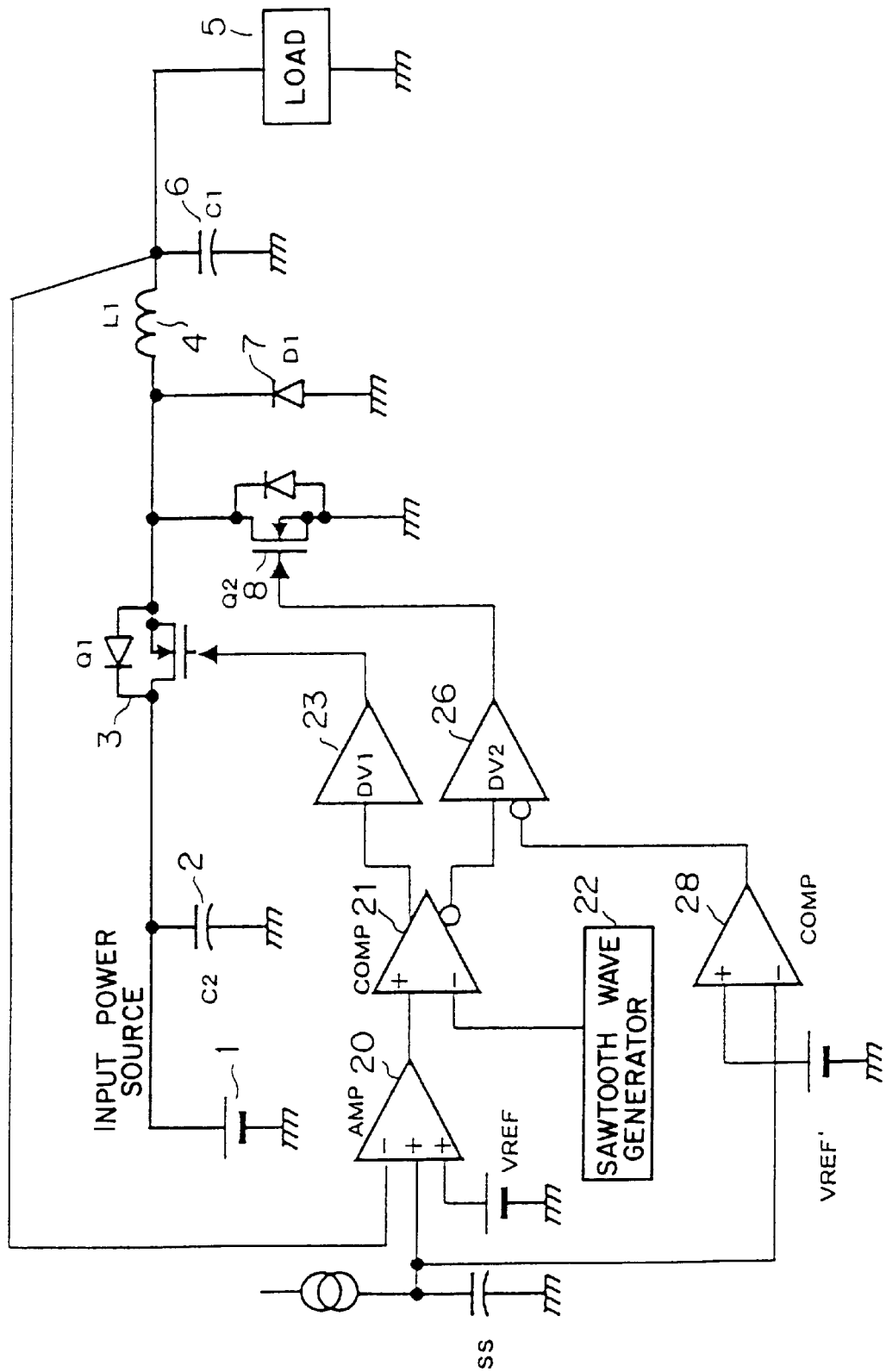
FIG. 9 is a circuit diagram showing the configuration of a second embodiment of the DC—DC convertor and its control circuit.

FIG. 9 is a circuit diagram of a second embodiment of the DC—DC convertor and its control circuit. If this figure is compared with the first embodiment shown in FIG. 8, a + (non-inverting) input terminal of the comparator 28 is connected with another reference voltage Vref' in place of the reference voltage Vref as shown in FIG. 8. At the time of activation of the DC—DC convertor, the comparator 28 outputs H until the soft start voltage reaches the value of the reference voltage Vref', and causes the output of the driver 26 to be L, thereby turning off the synchronous rectification transistor 8.

FIG. 10 is a circuit diagram of a third embodiment of the DC—DC convertor and its control circuit. If this figure is compared with the diagram showing the basic configuration shown in FIG. 6, there is one different point where the start-up detecting circuit 25 is configured by a timer circuit 35 to be activated together with the constant current source 14, according to the DC—DC convertor start-up signal.

FIG. 11 is a circuit diagram showing a configuration example of a timer circuit of the third embodiment shown in FIG. 10. In this figure, the timer circuit is configured by a comparator 36, a constant current source 37 to be activated by the DC—DC convertor start-up signal, a capacitor 38 to which a current from the constant current source is inputted, and a power source 39 for supplying a predetermined voltage Vset to the comparator 36. After the activation of the DC—DC convertor, the comparator 36 outputs H until the terminal voltage of the capacitor 38, which gradually rises with time, reaches the predetermined voltage Vset, and causes the output of the driver 26 to be L, thereby turning off the synchronous rectification transistor 8.

Figure 12:
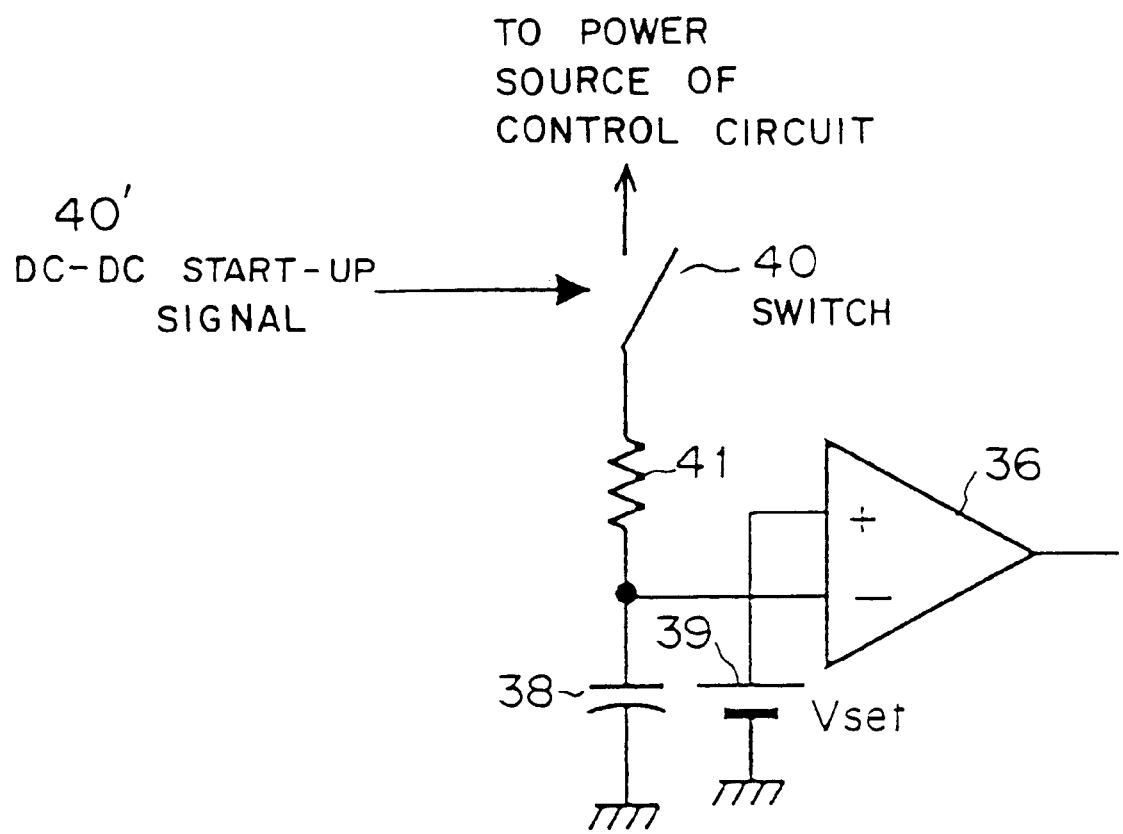
FIG. 12 is a diagram showing another configuration example of the timer circuit according to the third embodiment shown in FIG. 10.

FIG. 12 is a circuit diagram of another configuration example of the timer circuit of the third embodiment shown in FIG. 10. If this figure is compared with the configuration example shown in FIG. 11, there is one different point where a switch 40 to be turned on when the DC—DC convertor start-up signal is inputted, and a resistor 41 are provided in place of the constant current source 37. The operation is the same as that shown in FIG. 11. The comparator 36 outputs H until the terminal voltage of the capacitor 38 reaches the established voltage Vset, thereby turning off the synchronous rectification transistor 8.

Figure 13:
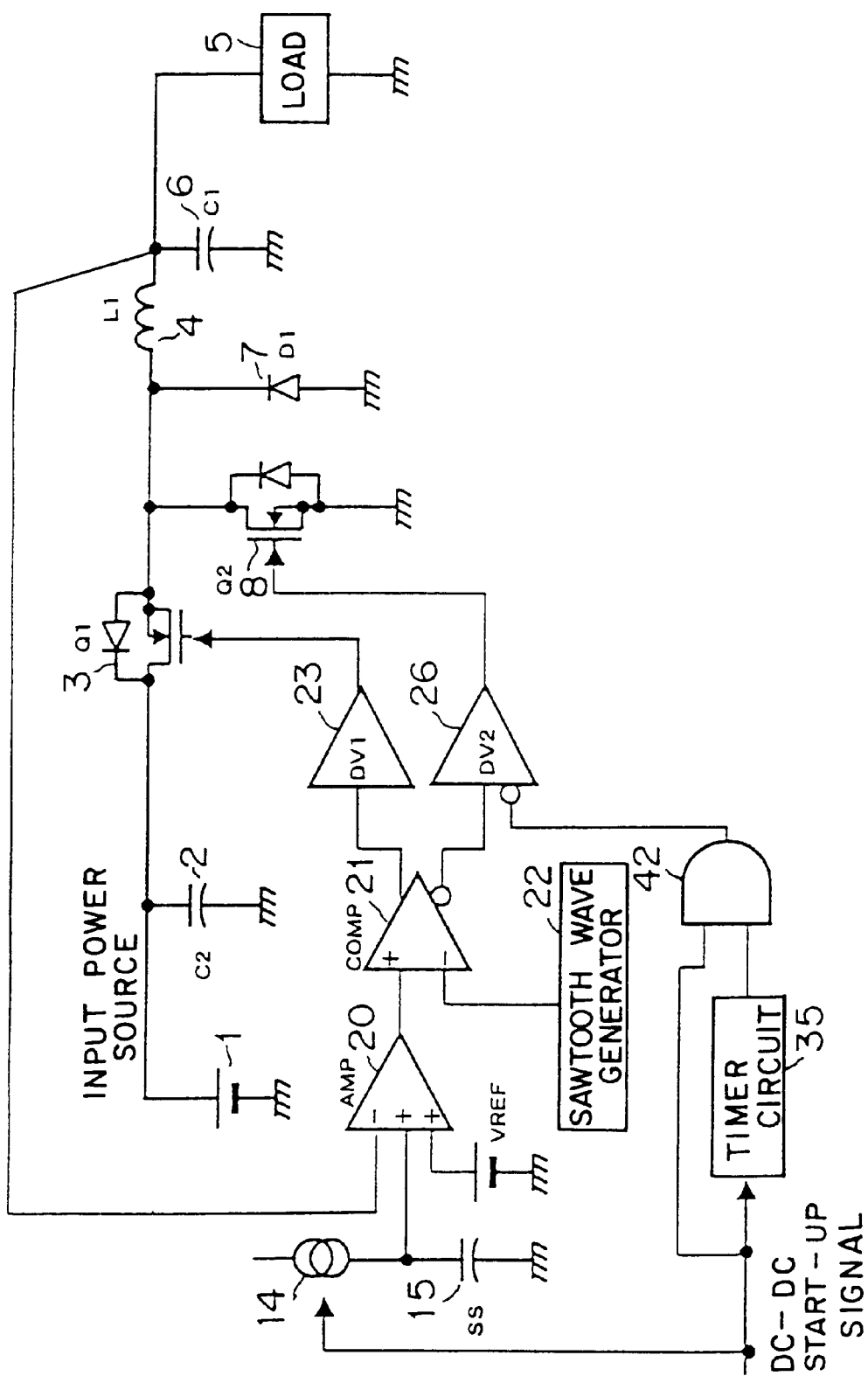
FIG. 13 is a circuit diagram showing the configuration according to a fourth embodiment of the DC—DC convertor.

FIG. 13 is a circuit diagram showing a fourth embodiment of a DC—DC convertor and its control circuit. If this figure is compared with the third embodiment shown in FIG. 10, there is one different point where an AND gate 42 is provided on an output side of the timer circuit 35, for enabling the output of the timer circuit 35 to be valid only while the DC—DC convertor start-up signal is H. If the DC—DC convertor start-up signal stays at H for a time τ after the DC—DC convertor start-up instruction is supplied, similarly to the output of the start-up detecting circuit 25 which was explained with reference to FIG. 7, the DC—DC convertor enables the output of the timer circuit 35 to be valid during this period, causes the output of the driver 26 to be L through the control of the AND gate 42, thereby turning off the synchronous rectification transistor 8.

FIG. 14 is a circuit diagram of the error amplifier with three inputs as shown in each of the embodiments shown in FIGS. 8 to 10 and 13. In FIG. 14, input signals inputted from two non-inverting input terminals are supplied to the bases of the two PNP transistors 43a and 43b which are connected in parallel with each other. Then, the amplifier determines which input has a lower potential between the two non-inverting inputs.

Figure 15:
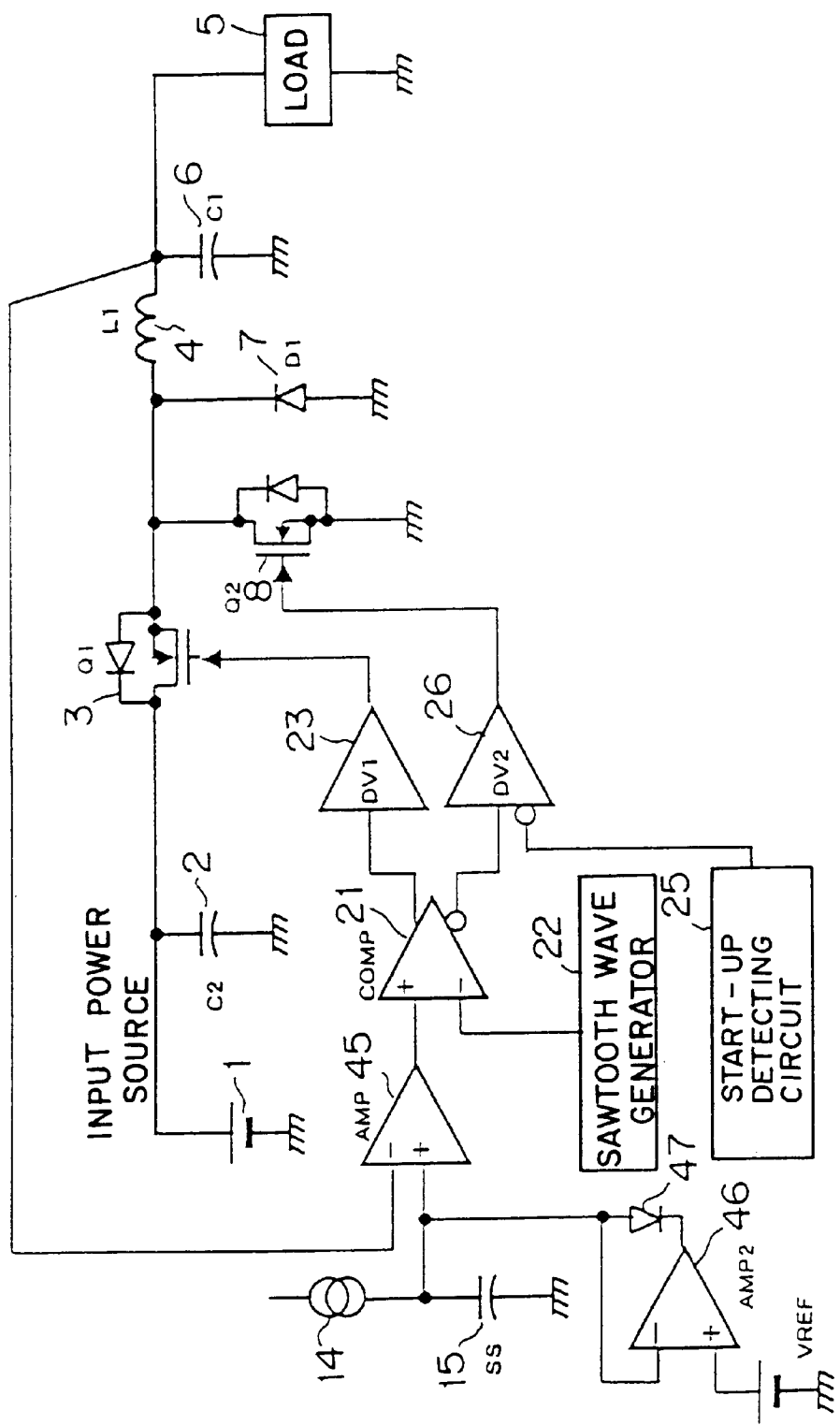
FIG. 15 is a circuit diagram showing the configuration according to a fifth embodiment of the DC—DC convertor.

FIG. 15 is a circuit diagram showing a fifth embodiment of a DC—DC convertor and its control circuit. If this figure is compared with the circuit diagram of the principle configuration shown in FIG. 6, there is a basic difference where an amplifier 45 with two inputs composed of one inverting input and one non-inverting input, is provided in place of the amplifier 20 for amplifying a voltage error, that is, the amplifier with three inputs composed of two non-inverting inputs and one inverting input. To the inverting input of this amplifier 45, a voltage obtained from the output voltage of the DC—DC convertor is inputted similarly to the process described with reference to FIG. 6. A circuit which is configured by an amplifier 46 and a diode 47 in parallel to the terminal voltage of the capacitor 15 for supplying a soft start voltage is connected with the non-inverting input.

A reference voltage to be connected with the non-inverting input terminal of the amplifier 46 is the same as a reference voltage to be connected with one of the non-inverting inputs of the amplifier 20 shown in FIG. 6 or the like. At the time of activation of the DC—DC convertor, while the terminal voltage of the capacitor 15 gradually rises according to the current outputted from the constant current source 14, the amplifier 46 only outputs a voltage proportional to the difference between the reference voltage Vref and the soft start voltage Vss, and does not contribute to the control of the DC—DC convertor. When the value of Vss reaches that of Vref, the difference between the input voltages supplied to the two input terminals of the amplifier 46 becomes 0, and the current outputted from the constant current source 14 only flows into an amplifier 46 side through the diode 47. The terminal voltage of the soft start capacitor 15 becomes constant at the value of Vref.

Figure 16:
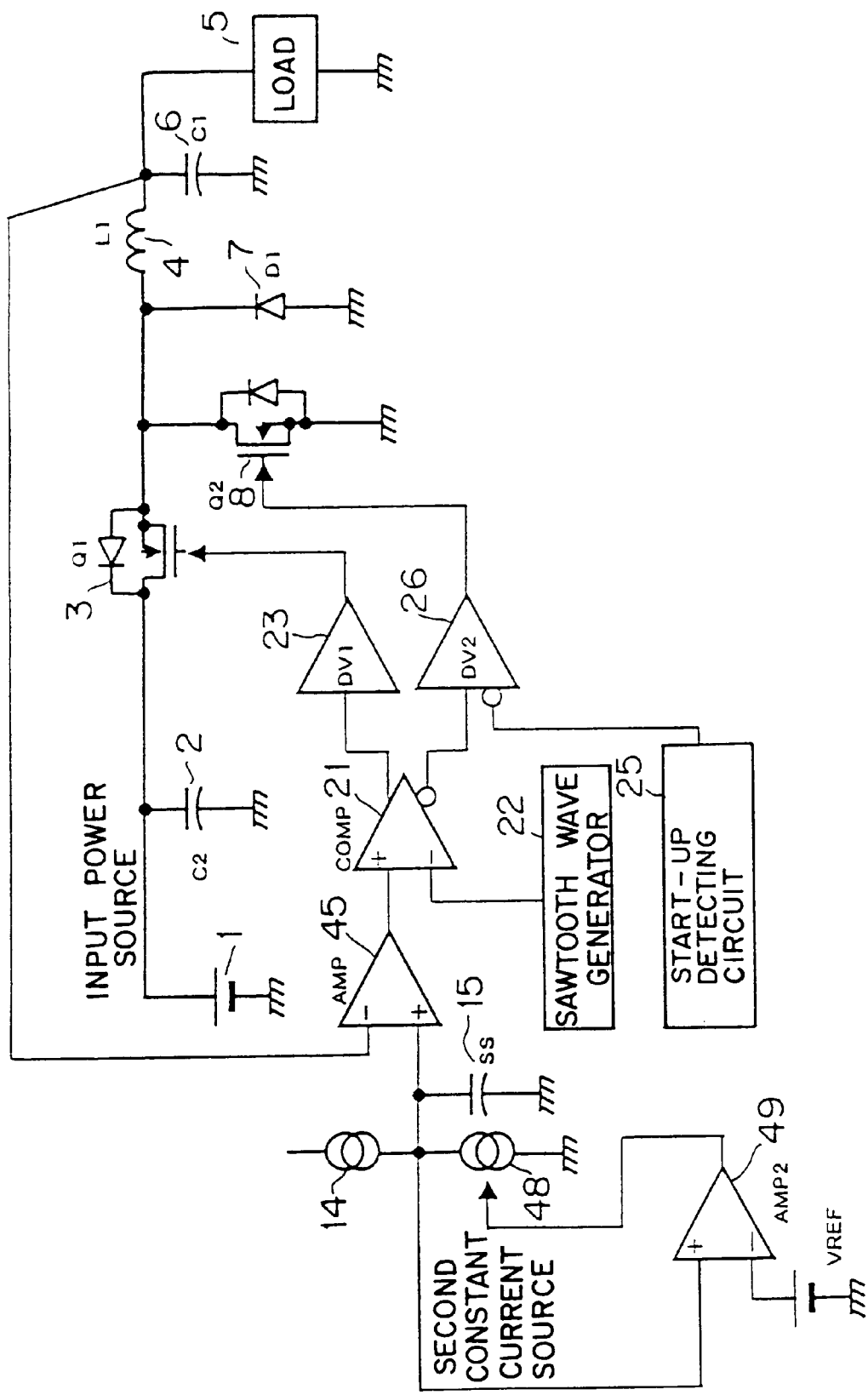
FIG. 16 is a circuit diagram showing the configuration according to a sixth embodiment of the DC—DC convertor.

FIG. 16 is a circuit diagram showing a sixth embodiment of a DC—DC convertor and its control circuit. When this figure is compared with the fifth embodiment shown in FIG. 15, there is one difference where an amplifier 49 for controlling the activation of a second constant current source 48 is connected in place of the circuit configured by the amplifier 46 and the diode 47, which is connected with the non-inverting input terminal of the amplifier 45 in parallel with the soft start capacitor 15.

The reference voltage Vref is connected with the non-inverting input terminal of the amplifier 49, and the terminal voltage of the soft start capacitor 15 gradually rises according to the current outputted from the constant current source 14. When this terminal voltage reaches the reference voltage Vref, the output of the amplifier 49 becomes 0. At this point, the second constant current source 48 is activated. By causing the current value of the second constant current source 48 to be identical to that of the constant current source 14, the current outputted from the constant current source 14 directly flows into the second constant current source 48 when and after the terminal voltage of the capacitor 15 reaches the reference voltage Vref. Accordingly, the terminal voltage of the capacitor 15 becomes constant at the value of Vref.

As a method of connecting the error amplifier 20 with an input terminal shown in, for example, FIG. 6 or the like, it is mentioned that the output of the DC—DC convertor is connected with an inverting input terminal of the amplifier, and the soft start voltage Vss and reference voltage Vref are respectively connected with the two non-inverting input terminals. Instead, even if these inputs are respectively connected with non-inverting, inverting, and inverting terminals of an amplifier, and the output of this amplifier is connected with a inverting terminal of a comparator, the same function can be normally realized.

As mentioned above, by compulsorily turning off the synchronous rectification transistor at the time of activation of the DC—DC convertor, the present invention can prevent the change in voltage level of the output of the DC—DC convertor, and also can prevent the destruction of the load, which is generated by the change in voltage level of the output. In this case, it is not necessary to reduce the gain of the error amplifier. Therefore, the present invention can enhance the practical efficiency of the DC—DC convertor without decreasing a response speed of the DC—DC convertor when the load changes rapidly.

What is claimed is:

1. A control circuit for controlling a direct current-direct current (DC—DC) convertor provided with a synchronous rectification transistor connected in parallel with a flywheel diode, comprising:

an output voltage controlling unit controlling the DC—DC convertor to keep an output voltage of the DC—DC converter constant; and a synchronous rectification transistor isolating unit compulsorily turning off the synchronous rectification transistor for a predetermined period of time which is independent of a cycle of synchronous rectification operations performed by the synchronous rectification transistor, at an activation time of the DC—DC converter.

2. The control circuit according to claim 1, further comprising:

a first reference voltage source for outputting a predetermined voltage; and error amplifying unit inputting a first voltage based on an output voltage of the DC—DC convertor, a second voltage which is an output of the first reference voltage source, and a third voltage rising at and after an activation of the DC—DC convertor, and for outputting a voltage obtained by amplifying a difference between the first voltage and the voltage having a lower voltage between the first and second voltages.

3. The control circuit according to claim 2, further comprising:

a constant current source for outputting a constant current; and a capacitor into which a fixed amount of current outputted from the constant current source flows, wherein in the control circuit, a voltage across the capacitor is inputted to the error amplifier as a third voltage.

4. The control circuit according to claim 2, still further comprising:

a voltage comparator for comparing a second voltage and a third voltage to be inputted to the error amplifier; and a driver for turning off the synchronous rectification transistor when the third voltage is lower than the second voltage after a comparison made by the voltage comparator.

5. The control circuit according to claim 2, wherein the synchronous rectification transistor isolating unit further comprises:

a second reference voltage source for outputting a predetermined voltage which is different from a voltage outputted by the first reference voltage source;

a voltage comparator for comparing a third voltage to be inputted to the error amplifier with a voltage to be outputted from the second voltage source; and a driver for turning off the synchronous rectification transistor when the third voltage is lower than a voltage outputted by the second voltage source after a comparison made by the voltage comparator.

6. The control circuit according to claim 2, wherein the synchronous rectification transistor isolating unit still further comprises:

a timer starting operations corresponding to an activation of the DC—DC convertor and stopping the operations when a predetermined time elapses; and a driver for turning off the synchronous rectification transistor while the timer is operating.

7. The control circuit according to claim 1 further comprising synchronous rectification transistor isolating operation enabling unit enabling operation of the synchronous rectification transistor isolating unit to be effective only at an activation time of the DC—DC convertor when the synchronous rectification transistor is compulsorily turned off by the synchronous rectification transistor isolating unit.

8. The control circuit according to claim 1 still further comprising an error amplifier to which a first voltage based on an output voltage of the DC—DC convertor and a second voltage rising at and after the activation of the DC—DC convertor, to be a maximum at a predetermined value, are inputted, and for outputting a voltage obtained by amplifying a difference between the first voltage and the second voltage, to the output voltage control unit.

9. A control circuit for controlling a direct current-direct current (DC—DC) convertor of a synchronous rectification type provided with a synchronous rectification transistor, the circuit comprising:

an output voltage controlling unit controlling the DC—DC convertor to keep an output voltage of the DC—DC convertor to keep an output voltage of the DC—DC convertor constant; and a synchronous rectification transistor isolating unit compulsorily turning off the synchronous rectification transistor for a predetermined period of time which is independent of a cycle of synchronous rectification operations performed by the synchronous rectification transistor, at an activation time of the DC—DC convertor.

* * * * *

UNITED STATES PATENT AND TRADEMARK OFFICE
CERTIFICATE OF CORRECTION

| | | |
|---|---|---|
| PATENT NO. | : 6,091,234 | Page 1 of 1 |
| APPLICATION NO. | : 09/124846 | |
| DATED | : July 18, 2000 | |
| INVENTOR(S) | : Kitagawa | |

It is certified that error appears in the above-identified patent and that said Letters Patent is hereby corrected as shown below:

In the Claims

In Claim 9, in column 12, lines 1 through 4:

an output voltage controlling unit controlling the
    DC--DC convertor to keep an output voltage of the
    DC--DC convertor ~~to keep an output voltage of the DC--DC convertor~~ constant; and

Should be:

an output voltage controlling unit controlling the
    DC--DC convertor to keep an output voltage of the
    DC--DC convertor constant; and

Signed and Sealed this
Twenty-ninth Day of April, 2014

Michelle K. Lee
*Deputy Director of the United States Patent and Trademark Office*